US008059586B2

(12) United States Patent
Bi (10) Patent No.: US 8,059,586 B2
(45) Date of Patent: Nov. 15, 2011

(54) MOBILITY MANAGEMENT ENTITY TRACKING FOR GROUP MOBILITY IN WIRELESS COMMUNICATION NETWORK

(75) Inventor: Hao Bi, Lake Zurich, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 412 days.

(21) Appl. No.: 12/478,449

(22) Filed: Jun. 4, 2009

(65) Prior Publication Data

US 2010/0311419 A1 Dec. 9, 2010

(51) Int. Cl.
*H04W 60/00* (2009.01)
(52) U.S. Cl. ............... 370/328; 455/435.1; 455/436
(58) Field of Classification Search ............ None
See application file for complete search history.

(56) References Cited

U.S. PATENT DOCUMENTS

| | | | | |
|---|---|---|---|---|
| 2009/0207782 | A1* | 8/2009 | Cheng et al. | 370/328 |
| 2009/0316629 | A1* | 12/2009 | Singh et al. | 370/328 |
| 2009/0316657 | A1* | 12/2009 | Singh et al. | 370/331 |
| 2010/0135206 | A1* | 6/2010 | Cherian et al. | 370/328 |

OTHER PUBLICATIONS

3GPP TSG RAN WG3 Meeting #64, San Francisco, USA May 4-8, 2009; LTE-A RAN3 Baseline Document; R3-091447.
3GPP TS 23.401 V9.0.0 (Mar. 2009); General Packet Radio Service (GPRS) Enhanements for Evolved Universal Terrestrial Radio Access Network (U-UTRAN) Access (Release 9).

* cited by examiner

*Primary Examiner* — Min Jung
(74) *Attorney, Agent, or Firm* — Roland K. Bowler, II (57) ABSTRACT

A method and apparatus for updating a wireless mobile device with mobility management entity (MME) identification information when the mobile device camps on a mobile relay node (RN), that supports group mobility, connected to a first base station (BS) supported by a first MME. In one embodiment, the mobile device receives an identity associated with a second MME when the mobile RN connects to a second BS served by a second MME without first sending a registration message. In another embodiment, the mobile device receives mobile RN specific MME identification information. Upon decamping from the mobile RN and camping on a new BS, the mobile device transmits the identity associated with the second MME or the mobile RN specific MME identification information for establishing a connection with the network.

14 Claims, 5 Drawing Sheets

MOBILITY MANAGEMENT ENTITY TRACKING FOR GROUP MOBILITY IN WIRELESS COMMUNICATION NETWORK

FIELD OF THE DISCLOSURE

The present disclosure relates generally to wireless communications and, more particularly, to a procedure for a mobile device to track changes in a serving mobility management entity while the mobile device is connected to a mobile relay node (RN) that supports group mobility, wherein the serving MME changes as the mobile RN moves about.

BACKGROUND

The tracking area update (TAU) procedure helps a mobility management entity (MME) know where a mobile device is located in a wireless communication network so that the mobile device can be paged efficiently. When the mobile device enters the coverage area of a new MME, the mobile device sends a TAU request to the new MME to notify the new MME of its change in location. The new MME must retrieve context information about the mobile device from the MME previously serving the mobile device. Thus the mobile device includes information identifying the previous MME in the TAU request sent to the new MME. After the new MME retrieves the context information for the mobile device from the old MME, the new MME sends the mobile device a TAU accept with identification information for the new MME.

Relay technologies have been considered to improve high data rate area coverage and to enable group mobility in Third Generation Partnership (3GPP) Universal Mobile Telecommunications Systems (UMTS) Long Term Evolution-Advanced (LTE-Advanced) networks. Such a network is also referred to as an Evolved Universal Terrestrial Radio Access Network (E-TRAN). A relay node (RN) is wirelessly connected to radio-access network (RAN) via a base station (eNB in 3GPP E-UTRAN). In the group mobility architecture, one or more mobile devices are connected to a mobile RN, which each mobile device perceives as a base station. The mobile RN may be installed on a vehicle such as train, bus or water vessel, or some other mobile entity on which one or more mobile devices reside. The mobile devices served by the mobile RN thus connect to the network via the mobile RN.

When a mobile device remains in a vehicle that supports group mobility, the mobile device is constantly connected to/camped on the mobile RN even when the vehicle moves about. Since there is no mobility such as cell reselection or handover observed by the mobile device, there is no need for the mobile device to send TAU requests and the mobile device will not receive TAU accept messages. However, as the entity on which the mobile RN moves about the network, handover is performed for the mobile RN to change the eNB serving the RN. Thus the MME serving the mobile RN may change. When the mobile device is handed over from the mobile RN to a different serving base station, the mobile device will not be able to provide the new serving base station/MME with the identity of the MME previously serving the mobile device via the mobile RN.

The various aspects, features and advantages of the invention will become more fully apparent to those having ordinary skill in the art upon a careful consideration of the following Detailed Description thereof with the accompanying drawings described below. The drawings may have been simplified for clarity and are not necessarily drawn to scale.

DETAILED DESCRIPTION

Figure 1:
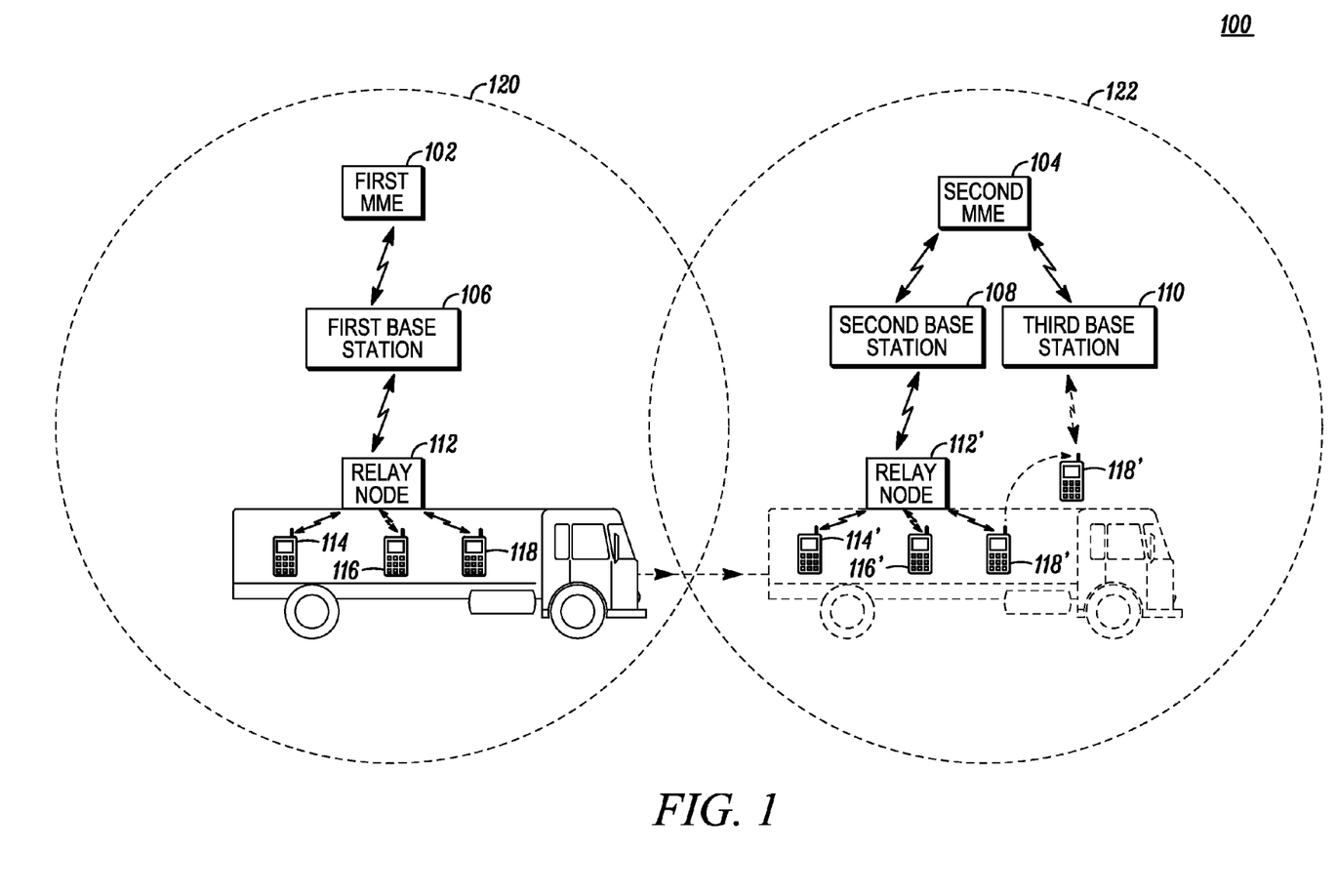
FIG. 1 illustrates a wireless communication network including a mobile RN serving one or more mobile devices.

FIG. 1 illustrates a wireless communication network 100 divided into a plurality of geographical areas 120 and 122, wherein geographical area is served by one or more base stations and a corresponding mobility management entity (MME) associated therewith. More generally, the network comprises additional areas which are served by other base stations and MMEs. The base stations may also be served by one or more base controllers not illustrated but known generally by those having ordinary skill in the art. The base stations and possible controllers generally constitute a radio access network. In FIG. 1, the geographical area 120 is served by a first base station 106 and an associated first MME 102. Similarly, the geographical area 122 is served by a second base station 108 and a third base station 110 and an associated second MME 104. In some wireless communication architectures, the MME is part of a core network to which access network is connected. The core network generally includes entities that provide authentication, call control/switching, accounting and gateway functionality.

In one implementation, the wireless communication network is compliant with the developing Long Term Evolution (LTE) of the 3GPP Universal Mobile Telecommunications System (UMTS) protocol wherein the base station transmits using an orthogonal frequency division multiplexing (OFDM) modulation scheme on the downlink and the user terminals transmit on the uplink using a single carrier frequency division multiple access (SC-FDMA) scheme. More generally, however, the wireless communication system may implement some other open or proprietary communication protocol. The disclosure is not intended to be limited to the implementation of any particular wireless communication system architecture or protocol.

The wireless communication network generally supports communications by and among one or more wireless communication devices, for example, mobile devices that move about the communication network. In FIG. 1, for example, a mobile device may move within the geographical area 120 or may move from one geographical area 120 to another geographical area 122. Each mobile device is associated with authentication and security information known as a context of the mobile device that is stored in the MME currently serving the mobile device. For example, the first MME 102 stores context information for each of the mobile devices that it serves. The mobile device context may provide authentication information of the mobile device and allowed services, such as broadband service, data service etc. for the mobile device. The context of the mobile device may also indicate the services such as GPRS, Voice SMS, etc., that may be offered or provided to the mobile device. As the mobile device moves from one geographical area to another, the context associated with the mobile device is forwarded to the corresponding MME. For example, when a mobile device enters the geographical area 122 from area 120, the context associated with the mobile device is forwarded from the first MME 102 to the second MME 104 serving the geographical area 122.

In some implementations, the context of the mobile device is transferred between MMEs as the mobile device registers with a new MME. In some embodiments, the mobile device context is managed using the tracking area update (TAU) procedure. Thus when the mobile device enters the coverage area of a new MME, the mobile device sends a TAU request to the new MME to notify the new MME of its change in location. The mobile device includes information identifying the previous MME in the TAU request sent to the new MME. The new MME retrieves context information about the mobile device from the MME previously serving the mobile device. After the new MME retrieves the context information for the mobile device from the old MME, the new MME sends the mobile device a TAU accept with identification information for the new MME.

In FIG. 1, the wireless communication network includes one or more mobile relay nodes that support group mobility. In FIG. 1, mobile devices 114-118 camp on mobile relay node (RN) 112. The mobile RN 112 and the camped mobile devices 114-118 currently reside in the geographical area 120, which is served by the base station 106 and the first MME 102. The mobile RN may be installed on a vehicle such as train, bus or water vessel, or some other mobile entity on which one or more mobile devices reside. The mobile devices served by the mobile RN thus connect to the network via the mobile RN. In group mobility, all mobile devices camping on the mobile RN move together with the mobile RN. Since the mobile devices continue to camp on the same mobile RN as the vehicle moves around, there is no change of cell camped on by the mobile devices, until the mobile devices exit the vehicle on which the mobile RN is installed.

FIG. 1 also illustrates the movement of the mobile RN 112 and the camped mobile devices 114, 116 and 118 from the geographical area 120 to the geographical area 122. The mobile RN 112 and the mobile devices 114, 116 and 118 in the newly moved-in geographical area 122 are represented as mobile RN 112' and mobile devices 114', 116' and 118', respectively. Each of the mobile devices 114, 115 and 118 perceive the mobile RN 112 as a base station. In one embodiment, the mobile device identifies and also distinguishes from the other base stations when the mobile device receives a unique cell global identity (CGI) that is assigned only to the mobile RNs in the network 100.

The mobile RN 112 is associated with transmission and reception capabilities, and authentication, and security information for the mobile RN known as a context of the mobile RN 112 that is stored in the MME currently serving the mobile RN. The context of the mobile RN 112 may indicate spectrum or frequency utilized by the mobile RN, encryption/integration algorithm used for communications between mobile RN and the mobile devices or the base station, special subscriptions provided to the mobile RN, and/or the identity of the RN, e.g., special CGI, indicating whether the mobile RN 112 is a regular base station or a relay node. The context of the mobile device includes transmission and reception capabilities, subscription, authentication, and security information for the mobile device. The context of a mobile device may be bounded to the context of a mobile RN, on which it camps. Bounding the context of the mobile device to the context of the mobile RN includes associating the mobile context with the context of the relay node based on identities of mobile device and the relay node. When the MME obtains the bounded context of the relay node, the MME may determine the identity of the mobile device camping on the mobile RN.

Operationally, the mobile devices 114, 116 and 118 residing in the geographical area 120 camp on the mobile RN 112. Upon camping on the mobile RN 112, each mobile device sends a registration message for establishing a connection with the first MME 102 via the mobile RN 112 and the first base station 106. The registration message includes information that indicates the MME storing the context associated with the corresponding mobile device. For example, the registration message sent from the mobile device 118 includes identification information of the MME that most recently stored the mobile context of the mobile device 118 before the mobile device 118 camping on the mobile RN 112. Upon receiving the registration request message, the first MME 102 identifies the MME storing the context of the mobile device 118 based on the identification information included in the registration request message. The first MME 102 then obtains the context of the mobile device 118 from the identified MME and bounds the context of the mobile device 118 with the context of the mobile RN 112.

As the mobile RN supporting group mobility moves about the network, the mobile RN sends new registration messages to the new base stations supporting the mobile RN. In FIG. 1, for example, when the mobile RN 112 and the camped mobile devices 114, 116 and 118 enter the second geographical area 122, the mobile RN 112' sends a new registration message to the second MME 104 via the second base station. Since the mobile devices 114, 116 and 118 still camp on the same mobile RN 112, there is no need for each of the mobile devices 114-118 to send a separate registration request message to the second MME 104. The new registration request message includes identification information for the first MME 102 having the context of the mobile RN 112. The registration request message may also contain information on the current security keys in use for encryption and integrity protection, and network capability of the mobile RN.

In FIG. 1, upon receiving the new registration message, the second MME 104 obtains the context of the mobile RN 112' from the first MME 102 and extracts any context information bounded with the context of the mobile RN 112'. Based on the extracted context information, the second MME 104 determines that mobile devices 114', 116' and 118' are camping on the mobile RN 112'. The second MME 104 then sends an identity associated with the second MME 104 to the corresponding camped mobile devices 114', 116' and 118' either by directly generating messages individually targeting at mobile devices 114', 116' and 118', or first generating message targeting at the mobile RN 112' and then getting its identity sent to mobile devices 114', 116' and 118' indirectly via messages generated by the mobile RN 112'. For example, NAS (Non Access Stratum) messages can be used in E-UTRAN to send the MME identity directly from the MME 104 to mobile devices 114', 116' and 118' individually; and AS (Access Stratum) messages can be used in E-UTRAN to send the MME identify indirectly from the mobile RN 112', after the mobile RN 112' receives the MME identity from the MME 104. The sent identity of the second MME 104 indicates that the mobile devices 114', 116' and 118' are now connected and served by the second MME 104.

From the mobile device perspective, the mobile devices 114', 116' and 118' each receive the identity associated with the second MME 104 and update the previously stored MME identity with the received identity of the second MME 104. The identity of the second MME may be stored in memory of the mobile device. This updated MME identification information may be later utilized by the mobile devices if and when the mobile devices decamp from the mobile RN 112' and camp on another mobile RN or on a base station. Such a scenario may occur for example, when the mobile device 118' disembarks from the vehicle hosting the mobile RN 112'. In FIG. 1, for example, the mobile device 118' may subsequently de-camp from the mobile RN 112' and camp on a third base station 110. The mobile device 118' thus sends the MME identification information stored in a memory inside it, corresponding to the last serving MME, i.e., the second MME 104 in FIG. 1, in a registration message, to the third base station, which forwards the registration message, including MME identification, to the new MME serving the third base station. The MME identity is indicative of the MME that currently stores the context associated with the mobile device 118. In FIG. 1, the third base station 110 is also served by the second MME 104, which happens to be the same MME that served the mobile device 118' when the mobile device camps on the mobile RN. More generally, however, the third base station may be served by an MME other than the second MME 104. Upon receiving the registration request message, the new MME identifies the MME storing the context of the mobile device 118' based on the identification information included in the registration request message. The new MME then obtains the context of the mobile device 118' from the identified MME. Thus, the mobile device 118 may easily establish a connection with the communication network 100 even when the mobile device 118 first moves with the mobile RN 112, and then decamps from the mobile RN 112'.

Figure 2:
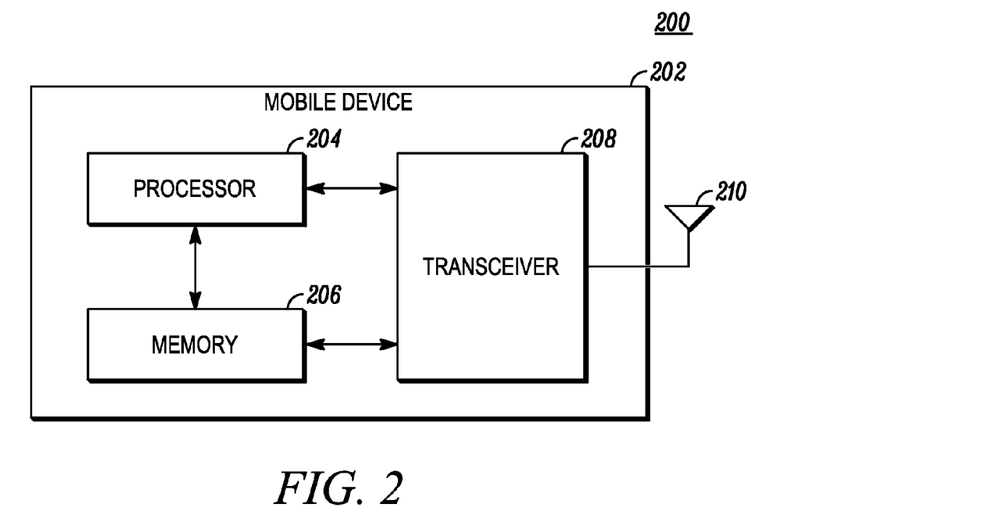
FIG. 2 is a block diagram illustrating exemplary internal components of a mobile device.

FIG. 2 is a schematic block diagram of a mobile device 200 comprising generally a processor 204 coupled to memory 206 and to a wireless transceiver 208 with one or more antennas 210. The mobile device 200 is representative of any of the mobile devices 114, 116 or 118 shown in FIG. 1. The memory 206 stores an identity of the MME to which the mobile device 200 is currently connected. The memory 206 can be fixed within the mobile device or a removable memory card inserted in the mobile device. During mobility, the mobile device 200 may connect to a new MME, e.g., the second MME 104, and the mobile device 200 may receive an identity associated with the new MME 104. The MME identity may be received either directly from MME through a message generated and originated by MME or indirectly from a message generated and originated by a base station, which is connected with the MME and receives the identity of the MME first. In embodiments where the mobile device is coupled to a mobile RN, the mobile RN may forward the MME identity information to the mobile device by originating a message and including the MME identity inside the message, or the mobile device may receive the information directly from the MME through a message generated and originated by the MME. For example, NAS (Non Access Stratum) messages can be used in E-UTRAN to send the MME identity directly from the MME to a mobile device; and AS (Access Stratum) messages can be used in E-UTRAN to send the MME identify indirectly from the mobile RN, after the mobile RN receives the MME identity from the MME. The controller 204 is configured to store the MME identification information in the memory 206. In one embodiment, the controller updates previously stored MME identity information with new MME identity information. In another embodiment, the memory stores a list of MME identities to which the mobile device 200 was recently connected.

In FIG. 2, the processor 204 is also configured to cause the transceiver 208 to send a registration message to the base station when the mobile device first camps on the base station to establish a connection with the communication network. In some instances, the base station may be a mobile RN as discussed above. In response to sending the registration message, the mobile device typically receives the identity of the MME associated with the serving bases station. The received MME identity is then stored in the memory 206. When the mobile device is coupled to a mobile RN, the mobile device may receive the identity of a new MME without sending the registration request message as the MME serving the mobile RN changes. The processor 204 is configured to cause the new MME identification information to be stored in memory 206. The processor 204 is also configured to cause the transceiver to transmit the updated MME identity when the mobile device decamps from the RN and establishes a connection with another base station.

In FIG. 2, the transceiver 208, coupled to the processor 204 and the memory 206, enables the mobile device 200 to communicate with one or more base stations and then their associated MME. An exemplary function of the mobile device 200 as represented by the block diagram, upon reception of wireless signals via the antenna 210, the transceiver 208 demodulates the communication signals to recover incoming information, such as voice and/or data, transmitted by the wireless signals. In some instances, the information received contains the identity associated with the MME associated with the base station or mobile RN to which the mobile device 200 is connected.

Figure 3:
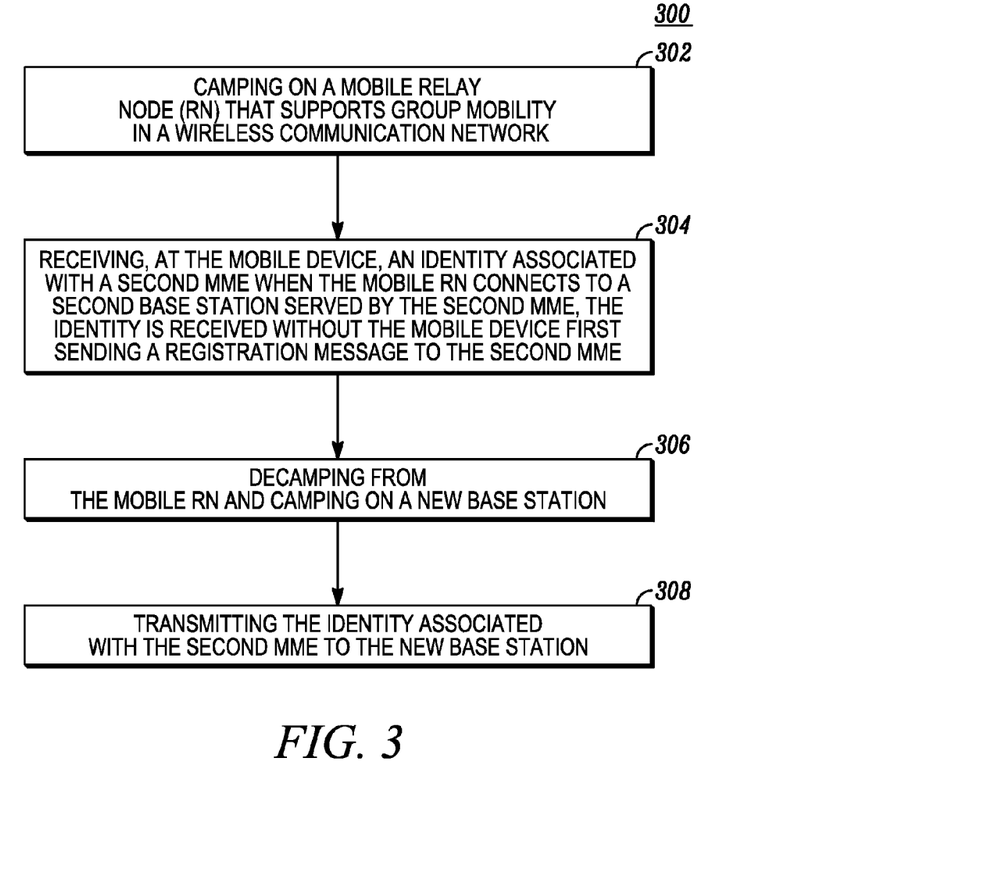
FIG. 3 is a flowchart of a method for updating a mobile device with mobility management entity (MME) identification information.

FIG. 3 is a flowchart 300 of a method for updating a mobile device with mobility management entity (MME) identification information. The flowchart of FIG. 3 is described from the perspective of a mobile device, for example, one of the mobile devices 114, 116 or 118 in FIG. 1. In FIG. 3, at 302, a mobile device camps on a mobile relay node (RN) that supports group mobility in a wireless communication network. In FIG. 1, for example, the mobile devices 114, 116 and 118 all camp on mobile RN 112, which is initially connected to the first base station 106 supported by the first MME 102. A mobile device may camp on a mobile RN when the mobile device gets into a vehicle such as train, bus or water vessel, or some other mobile vehicle or entity upon which the mobile RN is mounted or hosted. In some embodiments, the mobile device receives the identity associated with the MME serving the mobile RN when the mobile device initially camps on the mobile RN. For example, the mobile RN may send the MME identity to the mobile device in response to the mobile device sending a registration message, such as a tracking area update (TAU) message in E-UTRAN.

In FIG. 3, at 304, the mobile device receives MME identity information when the MME serving the mobile RN changes without the mobile device first sending a registration message or TAU message. As discussed above, the MME serving the mobile RN generally changes as the mobile RN moves about the network. When the MME serving the mobile RN changes, the mobile device is provided with an updated MME identity corresponding to the MME currently serving the mobile RN. The updated MME identity may be sent to the mobile device either directly by the MME serving the mobile RN or it may be forwarded to the mobile device by the mobile RN. Thus for example, in FIG. 1, the mobile devices 114, 116 and 118 are provided with the identity of the second MME 104 when the mobile RN transfers from the first base station 106 (served by the first MME 102) to the second base station 108, which is served by the second MME 104. Thus the identity of the second MME 104 is received by the mobile devices without first sending a registration message.

In one embodiment, the mobile device receives the updated mobility management entity (MME) identification information directly from the MME in a Non-Access Stratum message. A Non-Access Stratum (NAS) message refers to signaling terminating between a mobile device and an MME. In this case, the MME that sends the NAS message to the mobile device is the MME currently serving the mobile RN. The NAS message is distinguished from the Access-Stratum (AS) message, which is signaling terminating between base station and the mobile device. In other embodiments, the mobile device receives the identity associated with the second MME indirectly from the mobile RN. The identity associated with the second MME can be included in a system message broadcast by the mobile RN. Or, the identity associated with the second MME can be included in an AS message, such as a Radio Resource Control (RRC) message in E-UTRAN, targeting at the mobile device.

In some embodiments, the mobile device continuously camps on the mobile RN for some time interval after receiving the identity associated with the MME serving the mobile RN. The mobile device may receive the identity associated with the multiple mobility management entities serving the mobile RN in the time interval during which the mobile device continuously camps on the mobile RN. In other words, the mobile device need not de-camp and re-camp on a mobile RN before receiving an updated MME identity after receiving a MME identity upon initially camping on the mobile RN.

In FIG. 3, at 306, the mobile device decamps from the mobile RN and camps on a new base station. In FIG. 1, the new base station is the third base station 110. More generally, however, the mobile device may camp on some other entity, for example, another mobile RN or a base station. In FIG. 1, the mobile device may decamp from the mobile RN upon disembarking from the vehicle hosting the mobile RN. Then after moving out of the vehicle, the mobile device initiates a new registration with the communication network without employing the decamped mobile RN. At 308, the mobile device transmits the most recently stored MME identity to the new base station or mobile RN on which the mobile device is camping. In FIG. 1, for example, the mobile device 118' transmits the identity of the second MME 104 to the third base station 110.

Figure 4:
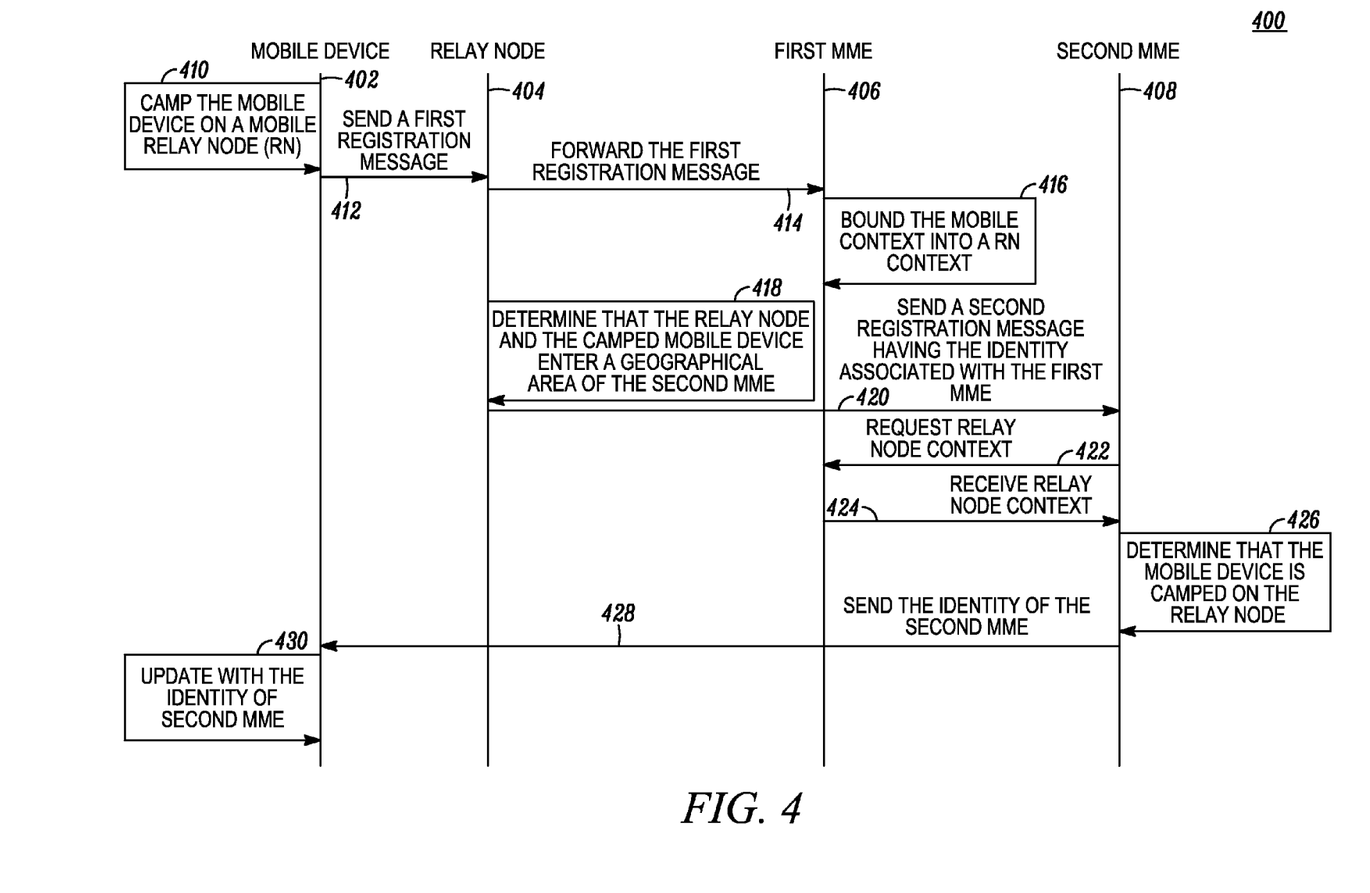
FIG. 4 is a signal flow diagram in a communication network for updating a mobile device with an identity associated with a serving MME.

FIG. 4 is a signal flow diagram in a communication network for updating a mobile device with an identity associated with a serving MME. The method 400 begins at 402 with the mobile device camping on a mobile RN that supports group mobility in the communication network. At 404, the mobile device sends a first registration message to a first MME via the mobile RN or the base station. The first registration request message includes identification information of the MME that has the mobile context associated with the mobile device. In one embodiment, the first registration message is sent in a Non-Access Stratum (NAS) message. The NAS message is used for signaling terminating between the mobile device and the MME.

In FIG. 4, at 414, the mobile RN forwards the first registration request message to the first MME currently serving the mobile RN. At 416, the first MME bounds the mobile context with a context container of the mobile RN upon which the mobile device is camped. At 418, the mobile RN determines that the mobile RN has entered a geographical area served by a second MME during group mobility in the communication network. At 420, the mobile RN sends a second registration message to the second MME for establishing a connection with the second MME. In one embodiment, the second registration message includes the identity associated with the first MME to which the mobile RN was most recently connected. At 420, the mobile device that camps on the mobile RN will not send a registration message to the second MME; only the mobile RN sends a registration message to the second MME. Upon receiving the MME identification information of the MME previously serving the mobile RN, the second MME determines that the context associated with the mobile RN is stored in the first MME to which the mobile RN was previously connected. At 422, the second MME requests the first MME to send the context associated with the relay node. At 424, the second MME receiving the context of the relay node in response to sending the request signal to the first MME. At 426, the second MME determines that the mobile device is camped on the mobile RN based on the mobile context bounded with the context container of the mobile RN. At 528, the second MME sends the identity of the second MME to the mobile device via the mobile RN. The identity of the second MME 104 may be sent in a NAS message to the mobile device. In one embodiment, the mobile RN receives the identity of the second MME and the mobile RN forwards it in a RRC connected message or transmits it in a broadcasted system message, so that even the mobile device in idle mode can receive it.

In FIG. 4, at 430, the mobile device updates the previous stored identity of the first MME with the received identity of the second MME. Thus, the mobile device is constantly updated with the identity of the MME serving the mobile device. Thereafter, when the mobile device decamps from the mobile RN, the mobile device may use the updated MME identification information to establish a connection with the communication network via a base station or relay node other than the mobile RN.

Figure 5:
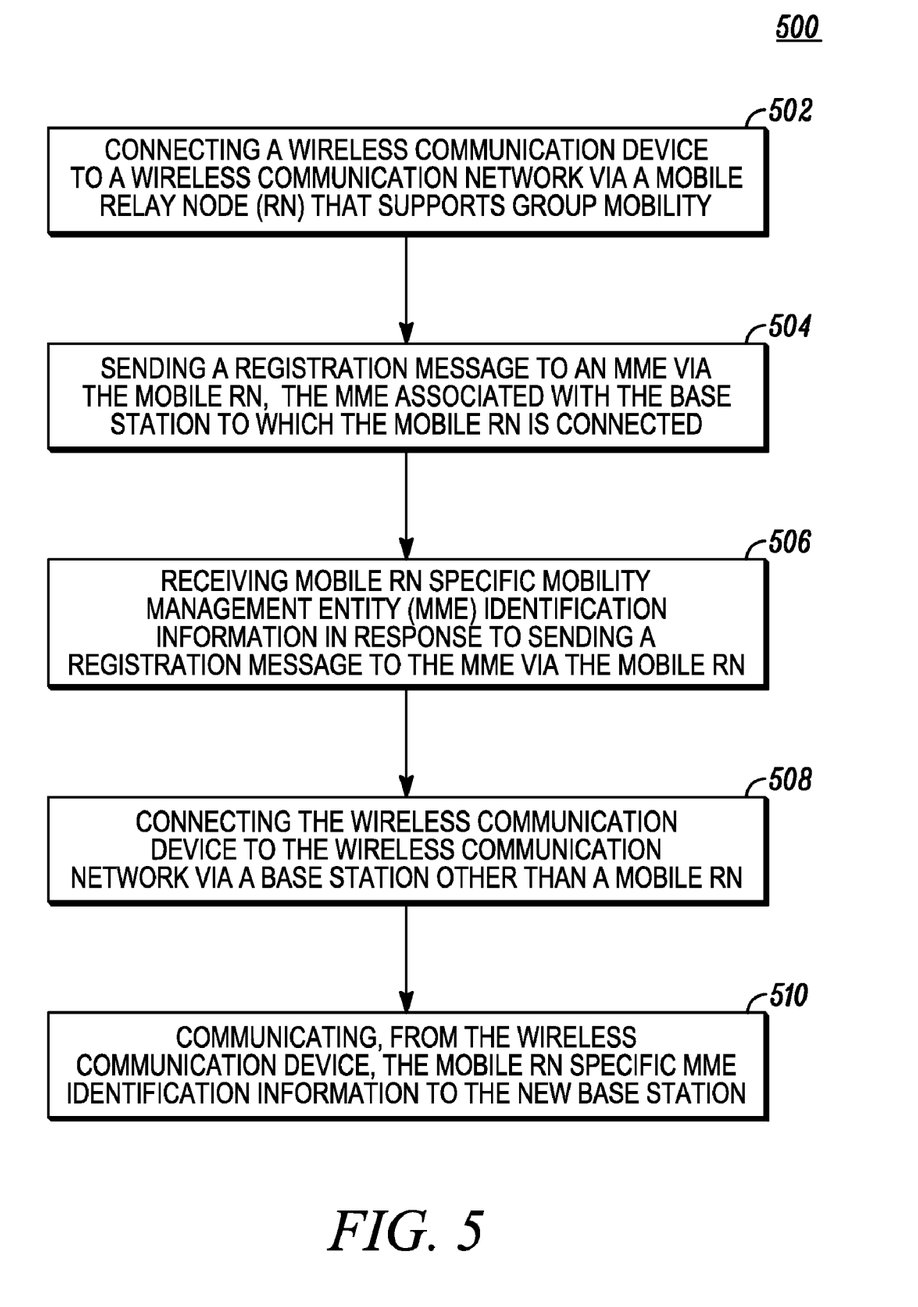
FIG. 5 is an alternative flowchart for a process in a mobile device coupled to a mobile relay node that supports group mobility.

FIG. 5 is a flowchart 500 performed by a mobile device coupled to a mobile relay node that supports group mobility. The flowchart of FIG. 5 is described from the perspective of a mobile device, for example, one of the mobile devices 114, 116 or 118 in FIG. 1. At 502, the mobile device connects to a wireless communication network via a mobile relay node (RN) that supports group mobility. At 504, the mobile device sends a registration message to the MME either directly or via the mobile RN. The MME is associated with a base station to which the mobile RN is connected. Thus the MME to which the mobile device sends the registration message is the MME that currently serves the mobile RN. Based on the registration message, the MME bounds the mobile context associated with the mobile device to the context of the mobile relay node.

In FIG. 5, at 506, the mobile device receives an indication, in response to sending the registration message, that a mobile RN specific mobility management entity (MME) identification information should be used in the subsequent registration messages. The indication may be an explicit flag-on signal. The indication may also be set implicitly by the presence of the mobile RN specific MME identification in the response message. The indication of the mobile RN specific MME identification may be received directly from the MME in a NAS message, or indirectly via the mobile RN through AS messages, such as RRC connected message or a broadcast system message. The mobile RN specific MME identification information is a pointer, which identifies the MME associated with the base station currently serving the mobile RN. That is, though the mobile RN specific MME identification information may not change during a time interval while the mobile device continuously camps on the mobile RN, the MME it identifies may change as the mobile RN moves around the network and enters a geographical area served by another MME. In one embodiment, the mobile RN specific MME identification information is a mobile RN specific code associated with the mobile RN. In one implementation, the code is a unique code that can be recognized by any of the MMEs in the communication network 100. In FIG. 1, the same mobile RN specific MME identification information, i.e., the same mobile RN specific code, points to the MME 102 when the mobile RN 112 is in the geographical area 120, but points to the MME 104 when the mobile RN 112' enters the geographical area 122. In one embodiment, the mobile device receives mobile RN specific mobility management entity (MME) identification information in a system message broadcast by the mobile RN.

In FIG. 5, at 508, the mobile device connects to a wireless communication network via a base station or relay node other than the mobile RN. In other words, the mobile device decamps from the mobile RN and camps on another base station or relay node. When the mobile device decamps from the mobile RN, the mobile device initiates a connection with the wireless communication network via a second base station 108 or with another mobile RN.

In FIG. 5, at 510, the mobile device communicates the mobile RN specific MME identification information, or unique code, to the new base station or mobile RN. The mobile device establishes a connection by utilizing the mobile RN specific MME identification information without sending the identity of any specific MME that previously served the mobile device. The mobile RN specific MME identification information indicates to the new base station or relay node, and the MME serving the new base station or relay node, that the mobile context associated with the mobile device is stored in the MME that served the mobile RN prior to the mobile device decamping from the mobile RN. Therefore, the MME serving the new base station or relay node can locate the context of the mobile RN first, and retrieve the mobile context associated with the mobile device, which is bounded with the context of the mobile RN.

In one embodiment, the mobile RN specific MME identification information is communicated to the new base station or relay node in a radio resource control (RRC) Connection Setup Complete message carrying a registration message. The mobile RN specific MME identification information may also be included in the NAS registration message to be communicated directly to the MME serving the new base station or relay node. The use of the mobile RN specific MME identification information eliminates the need to update the mobile device with the identity of the MME every time the mobile RN connects to a new MME, while the mobile device continuously camps on the mobile RN for some time interval.

Figure 6:
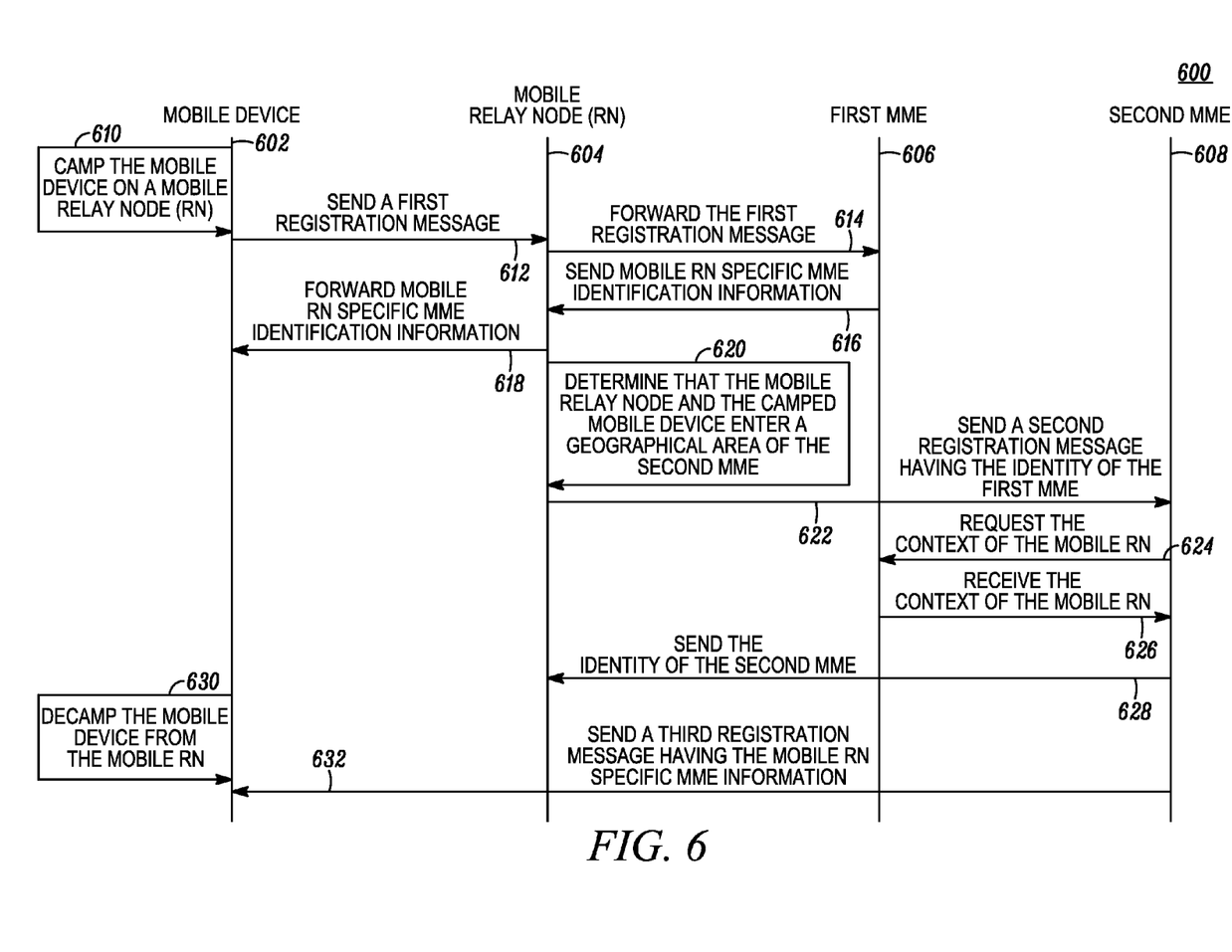
FIG. 6 is an alternative signal flow diagram in a communication network for updating a mobile device with an identity associated with a serving MME.

FIG. 6 is a signal flow diagram in a communication network for updating a mobile device with an identity associated with a serving MME. The method 600 begins at 610 with the mobile device camping on a mobile RN that supports group mobility in the communication network. At 612, the mobile device sends a first registration request message to a first MME via the mobile RN or the base station. In one embodiment, the first registration message is sent in a Non-Access Stratum (NAS) message.

In FIG. 6, at 614, the mobile RN forwards the first registration request message to the first MME currently serving the mobile RN. At 616, the first MME sends mobile RN specific MME identification information associated with the mobile RN. At 618, the mobile RN forwards the mobile RN specific MME identification information to the mobile device. The received mobile RN specific MME identification information is stored in the mobile device. At 620, the mobile RN determines that the mobile RN has entered a geographical area served by a second MME during group mobility in the communication network. At 622, the mobile RN sends a second registration message to the second MME. The second registration message is sent to the second MME for establishing a connection with the second MME. In one embodiment, the second registration message includes the identity associated with the first MME to which the mobile RN was most recently connected. Upon receiving the MME identification information, the second MME determines that the context associated with the mobile RN is stored in the first MME to which the mobile RN was previously connected.

At 624, the second MME requests the first MME to send the context associated with the mobile RN. At 626, the second MME receives the context of the mobile RN in response to sending the request signal to the first MME. The second MME authenticates the mobile RN based on the received context of the mobile RN. At 628, the second MME sends the identity of the second MME to the mobile RN. At 630, the mobile device decamps from the mobile RN. For example, the mobile device gets off the vehicle that carries the mobile RN. At step 632, the mobile device sends a third registration message having the mobile RN specific MME information to a new base station, which may or may not be a mobile RN. The mobile RN specific MME information is used by a new MME serving the new base station to locate the mobile device context information for the mobile device. Thus the new MME obtains mobile device context information from the MME that served the mobile RN with which the mobile RN specific MME identification information is associated. The new MME may communicate with neighboring MME to determine which MME supported the mobile RN to which the mobile device was most recently connected. Thus, the mobile RN specific MME identification information eliminates the need to update the mobile device with the identity of the new MME every time the mobile RN connects to a new MME.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method for updating a mobile device with mobility management entity (MME) identification information during group mobility in a wireless communication network, the method comprising:
    camping on a mobile relay node (RN) that supports group mobility in the wireless communication network,
    the mobile RN connected to a first base station supported by a first MME;
    receiving, at the mobile device, an identity associated with a second MME when the mobile RN connects to a second base station served by the second MME,
    the identity of the second MME received while the mobile device is camped on the mobile RN without the mobile device first sending a registration message to the second MME.

2. The method of claim 1 further comprising:
    decamping the mobile device from the mobile RN and camping the mobile device on a new base station,
    transmitting, from the mobile device, the identity associated with the second MME to the new base station.

3. The method of claim 1 further comprising
    camping on the mobile RN for a continuous time interval;
    receiving, at the mobile device, the identity associated with the first MME and the identity associated with the second MME during the continuous time interval.

4. The method of claim 1 further comprising:
    storing the identity associated with the first MME;

updating the identity associated with the first MME with the identity associated with the second MME after receipt of the identity associated with the second MME.

5. The method of claim 1, receiving the first updated mobility management entity (MME) identification information in a non-access stratum message.

6. The method of claim 1, receiving the identity associated with the second MME in a system message broadcast by the mobile RN.

7. The method of claim 1 further comprising operating the mobile device in a radio resource control (RRC) connected mode, wherein the identity associated with the second MME is received in a radio resource control (RRC) message from the mobile RN.

8. The method of claim 1, sending a first registration message, to the first MME via the mobile RN, the first registration message for bounding a context of the mobile device with a context of the mobile RN.

9. A method in a mobile device coupled to a mobile relay node that supports group mobility, the method comprising:
   connecting the mobile device to a wireless communication network via a mobile relay node (RN) that supports group mobility;
   sending a registration message to an MME via the mobile RN, the MME associated with a first base station to which the mobile RN is connected;
   in response to sending the registration message, receiving an indication to use mobile RN specific mobility management entity (MME) identification information in future registration messages,
   the mobile RN specific MME identification information is uniquely associated with the mobile RN;
   connecting the mobile device to the wireless communication network via a new base station other than the mobile RN; and
   communicating, from the mobile device, the mobile RN specific MME identification information to the new base station.

10. The method of claim 9, communicating the mobile RN specific MME identification information to the new base station in a radio resource control (RRC) Connection Setup Complete message carrying a registration message.

11. The method of claim 9, communicating the mobile RN specific MME identification information to an MME serving the new base station in a registration message.

12. A method in a mobility management entity (MME) in a wireless communication network, the method comprising:
   receiving mobile relay node (RN) specific MME identification information from a mobile device camped on a base station served by the MME,
   the mobile RN specific MME identification information is uniquely associated with a mobile RN that served the mobile device before the mobile device camped on the base station served by the MME;
   obtaining mobile device context information from another MME that served the mobile RN with which the mobile RN specific MME identification information is associated,
   wherein the context information for the mobile device is bound on the another MME with context information for the mobile RN with which the mobile RN specific MME identification information is uniquely associated.

13. The method of claim 12, wherein the mobile device context information includes network capability and service subscription information for the mobile device.

14. The method of claim 12, wherein the context of the mobile device includes authentication and security information of the mobile device.

* * * * *